(12) United States Patent
Curasi et al.

(10) Patent No.: US 8,558,466 B2
(45) Date of Patent: Oct. 15, 2013

(54) EVENT DETECTION AND ENVIRONMENTAL CONTROL WITHIN A STRUCTURE

(75) Inventors: Joseph Basil Curasi, Morgan Hill, CA (US); Tanuj Mohan, Sunnyvale, CA (US); Zachary Gentry, Sunnyvale, CA (US)

(73) Assignee: enLighted, Inc.

( * ) Notice: Subject to any disclaimer, the term of this patent is extended or adjusted under 35 U.S.C. 154(b) by 145 days.

(21) Appl. No.: 13/304,503

(22) Filed: Nov. 25, 2011

(65) Prior Publication Data

US 2013/0069542 A1   Mar. 21, 2013

Related U.S. Application Data

(60) Provisional application No. 61/537,180, filed on Sep. 21, 2011.

(51) Int. Cl.
*H05B 37/02* (2006.01)
*G01J 5/10* (2006.01)
*H01J 40/14* (2006.01)

(52) U.S. Cl.
USPC .......................................... 315/155; 315/149

(58) Field of Classification Search
None
See application file for complete search history.

(56) References Cited

U.S. PATENT DOCUMENTS

| | | | |
|---|---|---|---|
| 5,101,141 A | 3/1992 | Warner et al. | |
| 5,179,324 A | 1/1993 | Audbert | |
| 5,191,265 A | 3/1993 | D'Aleo et al. | |
| 5,283,516 A | 2/1994 | Lohoff | |
| 5,812,422 A | 9/1998 | Lyons | |
| 6,057,654 A | 5/2000 | Cousy et al. | |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 7,309,985 B2 | 12/2007 | Eggers et al. | |
| 7,348,736 B2 | 3/2008 | Piepgras et al. | |
| 7,382,271 B2 | 6/2008 | McFarland | |
| 7,437,596 B2 | 10/2008 | McFarland | |
| 7,550,931 B2 * | 6/2009 | Lys et al. | 315/291 |
| 7,566,137 B2 | 7/2009 | Veskovic | |
| 7,792,956 B2 | 9/2010 | Choong et al. | |
| 7,925,384 B2 | 4/2011 | Huizenga et al. | |
| 2002/0047549 A1 * | 4/2002 | Klotz et al. | 315/149 |
| 2004/0002792 A1 | 1/2004 | Hoffknecht | |
| 2005/0169643 A1 | 8/2005 | Franklin et al. | |
| 2006/0275040 A1 | 12/2006 | Franklin | |
| 2007/0057807 A1 | 3/2007 | Walters et al. | |
| 2007/0061050 A1 | 3/2007 | Hoffknecht | |
| 2007/0086128 A1 | 4/2007 | Lane et al. | |
| 2007/0215794 A1 | 9/2007 | Cernasov et al. | |

(Continued)

*Primary Examiner* — Crystal L Hammond
(74) *Attorney, Agent, or Firm* — Brian R. Short (57) ABSTRACT

Embodiments of methods, apparatuses and systems for identifying an event are disclosed. One method includes sensing motion with a motion sensor, wherein the motion sensor is stationary, and the motion sensor senses motion of an object that is external to the motion sensor. The embodiment further includes matching the sensed motion with one of a plurality of stored patterns of events, and identifying an event associated with the sensed motion based on a match between a one of the plurality of patterns and the sensed motion. One apparatus includes a sensing device, wherein the sensing device includes a light sensor sensing motion and a processor. The processor is configured to match the sensed motion with one of a plurality of stored patterns of events, and identify an event associated with the sensed motion based on a match between a one of the plurality of patterns and the sensed motion.

23 Claims, 10 Drawing Sheets

(56) References Cited

U.S. PATENT DOCUMENTS

| | | |
|---|---|---|
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemal et al. |
| 2010/0270933 A1 | 10/2010 | Chemal et al. |
| 2010/0295482 A1 | 11/2010 | Chemal et al. |
| 2010/0301773 A1 | 12/2010 | Chemel et al. |
| 2011/0031897 A1 | 2/2011 | Henig et al. |

* cited by examiner

Sensing motion with a motion sensor, wherein the motion sensor is stationary, and senses motion of an object that is external to the motion sensor

710

Matching the sensed motion with one of a plurality of stored patterns of events

720

Identifying an event associated with the sensed motion based on a match between a one of the plurality of patterns and the sensed motion

External View of Fresnel Lens 920

Side View of Fresnel Lens 920

Fresnel Lens and IR Sensor On Ceiling of Structure 960

Path Traveled by Occupant 980

EVENT DETECTION AND ENVIRONMENTAL CONTROL WITHIN A STRUCTURE

RELATED APPLICATIONS

This patent application claims priority to provisional patent application Ser. No. 61/537,180, filed on Sep. 21, 2011, and is herein incorporated by reference.

FIELD OF THE EMBODIMENTS

The described embodiments relate generally to environmental control within a structure. More particularly, the described embodiments relate to identification of events within the structure, and utilizing the identification of the events to aid in controlling the environment within the structure.

BACKGROUND

Lighting systems are being designed to conserve energy. One form of an energy conserving lighting system includes at least one motion detector that detects occupancy. Only when an occupant is detected are lights of the lighting system activated, thereby saving energy.

Typically, motion activated lighting is triggered upon sensing motion. Once activated, lights associated with the lighting remain active (turned on) for a set amount of time. After the set amount of time, the lights are deactivated (turn off). This arrangement, however, has several limitations. For example, if an occupant is merely passing through a room that includes the motion activated lighting, the lights remain on even though the occupant has left the room, thereby wasting energy lighting a room without an occupant. Another limitation with the above-describe motion activated system is that if an occupant enters a room and then remains near-motionless for a period greater than the set amount of time, the lights will turn off while the occupant is still within the room, which can be annoying to the occupant. The occupant is then required to act with enough motion to reactivate the lighting for another set amount of time.

Typical passive infrared, ultrasonic or dual technology based motion sensors used in building control provide a contact closure and a timer associated with that contact closure. There is no intelligence in determining or reacting differently to different types of motion. This limitation forces a compromise between occupant comfort and energy savings.

It is desirable to have methods, systems and apparatuses for detecting and identifying events that occur within structures to provide both energy savings, and provide a user-friendly environment.

SUMMARY

One embodiment includes a method of identifying an event. The method includes sensing motion with a light detector, matching the sensed motion with one of a plurality of stored patterns of events, and identifying an event associated with the sensed motion based on a match between a one of the plurality of patterns and the sensed motion.

Another embodiment includes a method of identifying an event. The method includes sensing motion with a motion sensor, wherein the motion sensor is stationary, and the motion sensor senses motion of an object that is external to the motion sensor. The embodiment further includes matching the sensed motion with one of a plurality of stored patterns of events, and identifying an event associated with the sensed motion based on a match between one of the plurality of patterns and the sensed motion.

Another embodiment includes a sensing device. The sensing device includes a light sensor sensing motion and a processor. The processor is configured to match the sensed motion with one of a plurality of stored patterns of events, and identify an event associated with the sensed motion based on a match between one of the plurality of patterns and the sensed motion.

Another embodiment includes a lighting fixture. The lighting fixture includes a light, a motion sensor sensing motion, and a controller. The controller is configured to match the sensed motion with one of a plurality of stored patterns of events, identify an event associated with the sensed motion based on a match between a one of the plurality of patterns and the sensed motion, and adjust an intensity of the light based at least in part on the events identified by the motion sensor.

Another embodiment includes a lighting system. The lighting system includes a plurality of lighting fixtures that communicate with each other. Each lighting fixture includes a light, a motion sensor sensing motion, and a processor. The processor is configured to match the sensed motion with one of a plurality of stored patterns of events, identify an event associated with the sensed motion based on a match between a one of the plurality of patterns and the sensed motion, and adjust an intensity of the light based at least in part on the identified event.

Other aspects and advantages of the described embodiments will become apparent from the following detailed description, taken in conjunction with the accompanying drawings, illustrating by way of example the principles of the described embodiments.

DETAILED DESCRIPTION

The described embodiments include apparatuses, systems and methods for identifying events. Specific embodiments include identifying events within a room, building or structure that can be used for identifying, for example, activities of person(s) or occupants, which can be used to provide intelligent lighting control of the room, building or structure. Additionally, or alternatively, the identified events can be used to control security, and/or other environmental aspects, for example heating/cooling, of the room, building or structure.

At least some embodiments additionally identify one or more sequences of events. For example, a person entering a structure and then leaving the structure includes a sequence of identifiable events. Also, for example, a person entering a structure and then remaining near-motionless within the structure includes a sequence of identifiable events. A lighting control system can intelligently utilize the identification of these sequences of events to control lighting within the structure. The term structure can be loosely interpreted as any area that can be intelligently controlled, such as, a building, a room, a parking structure, a parking lot, etc. Generally, the more knowledge and information a controller has about the environmental conditions of the structure, the more intelligently the controller can control the environmental conditions. While most of the described embodiments may be associated with lighting and intelligent lighting systems, it is to be understood that the embodiments can be adapted to control other types of environmental conditions of a structure, such as, heating, cooling, and adapted to security systems.

Figure 1:
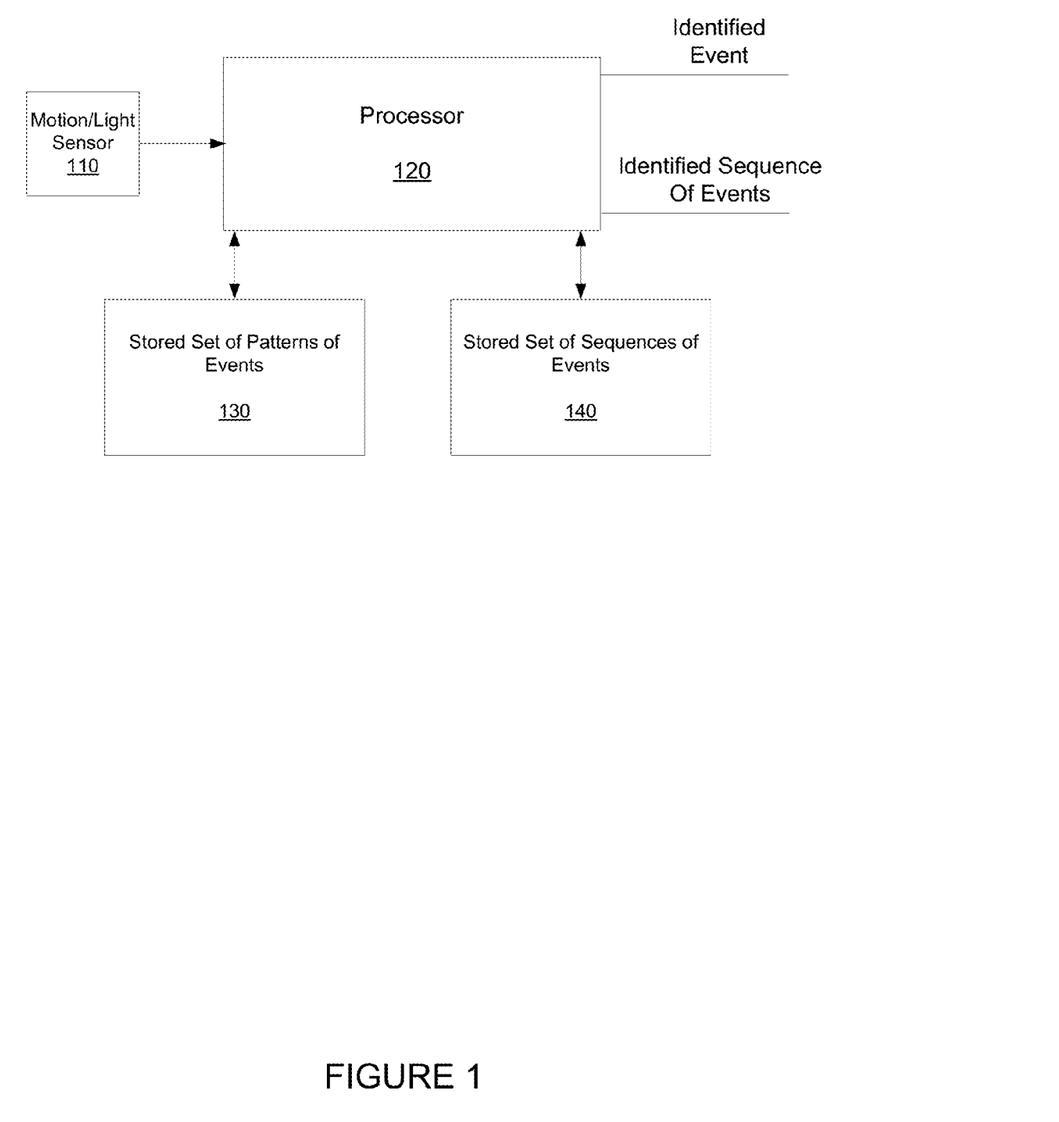
FIG. 1 shows a block diagram of event detector according to an embodiment.

FIG. 1 shows a block diagram of event detector according to an embodiment. As shown, a motion/light sensor 110 senses motion within, for example, a structure. Various embodiments include different embodiments of motion sensors. For one embodiment, the motion sensor includes an infrared (IR) sensor. For another embodiment, the motion sensor includes an ambient light sensor. Other embodiments include ultrasonic motion sensors, dual tech (PIR/ultrasonic, PIR/microphonic, etc.) motion sensors, and camera/image based motion sensors.

A sensed signal of the motion/light sensor 110 is received by a processor 120. The processor 120 identifies an event by matching the sensed signal with a plurality of stored event patterns stored, for example, in a stored set of patterns of events database 130. For one embodiment, the sensed signal is sampled, and the processor 120 includes digital signal processing that matches set of samples of the stored event patterns. For another embodiment, the sensed signal is an analog signal and the processor 120 matches the analog signal with stored patterns of analog signals.

Exemplary patterns of events include, for example, an occupant entering a room, an incandescent lamp being turned on, direct unfiltered sunlight, an abrupt entry well within a perimeter of the structure (that is, for example, a break-in), a small animal (such as, a dog or a cat) running into the room or structure, rising steam from boiling water (for example, steam/heat from a burst heating/water pipe), fluctuations in near IR ambient light, entry of an automobile in a parking garage, a heating or air conditioning (AC) unit on, a portable space heater unit on, operation of a fire place, and/or a microwave or toaster oven on. Each of these events depicts a pattern that can be detected and identified through, for example, an IR sensor located in a structure (room) in which the event occurs. The detection of the event can be used to control lighting, temperature and/or security of the structure.

An embodiment of the processor 120 provides an indicator of an identified event. That is, once a match between the sensed signal and one of the stored patterns of event has been made, the processor 120 provides an indication of the match. Further, the processor can monitor the identified events over time, and match sequences of identified events with a stored set of sequences of events 140. That is another data base which includes stored sequences of events 140 which can provide for the identification of an activity that includes a predetermined sequence of events. An exemplary activity includes a person passing through the structure without stopping. That is, for example, the person walks through a room without stopping or staying in the room. Another exemplary activity includes the person entering the room, sitting and remaining near motionless. Both of these exemplary activities include a sequence of identifiable events.

Standard motion detectors sense motion and subsequently activates a light for a set period of time. If a person merely passes through a room with such a motion sensing and light combination, power is wasted lighting a room in which no one is present. If the person enters the room and remains near-motionless (that is, less motion than required to trigger the motion sensor) the light may turn off after the set period of time, which can be annoying to the person. The described embodiments eliminate these problems by specifically identifying events that occur, and reacting accordingly.

Figure 2:
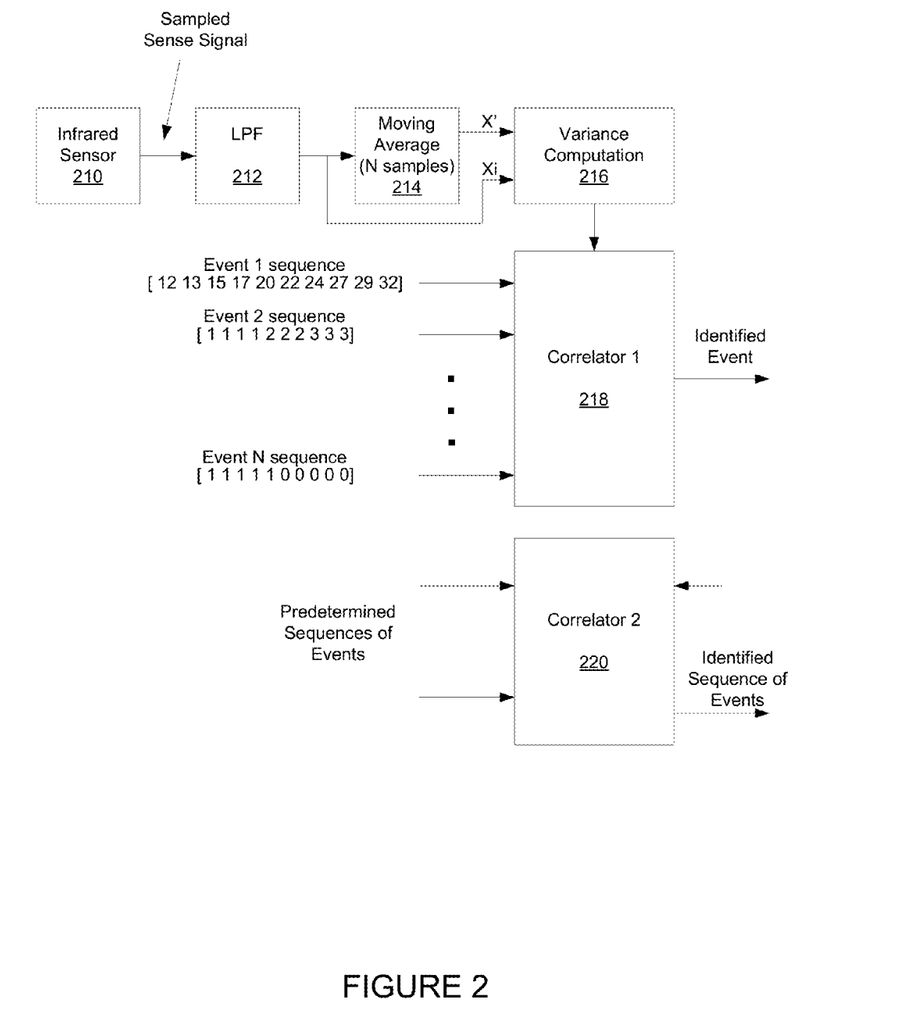
FIG. 2 shows a more detailed block diagram of an event detector according to an embodiment.

FIG. 2 shows a more detailed block diagram of an event detector according to an embodiment. This embodiment includes an infrared (IR) sensor 210 that generates digital samples of a sensed IR signal. The sensed IR signal is filtered with a low pass filter (LPF) 212 to remove noise. The filtered signal is averaged over N samples. The number of samples N is selectable and adaptive, but an embodiment can advantageously select N to be a power of two to reduce processing complexity. A variance computation block 216 receives the averaged signal (X') and the instantaneous samples (Xi) and generates a variance signal. A correlator 218 matches the variance signal with a one of stored event sequences to provide identification of an event based upon the sensed signal of the IR sensor 210.

Embodiments include the stored event sequences being of length less than or equal to the number of samples N. Event sequences need not be of equal lengths. Prefixing, annexing, or inserting an event sequence with zeros effectively shortens or divides its sequence.

For at least some embodiments, the correlation is computed by comparing each instantaneous sample to its corresponding value in each of the stored event sequences for all N samples. If an instantaneous sample meets or exceeds its corresponding value of a stored event, a logical TRUE bit is set for that sample of that event. An event is detected when all N samples are TRUE, and the selected event is that of the highest priority.

A second correlator 220 can be included for matching sequences of identified events, thereby providing more information about activities occurring in the structure (for example, a room of a building).

Figure 9:
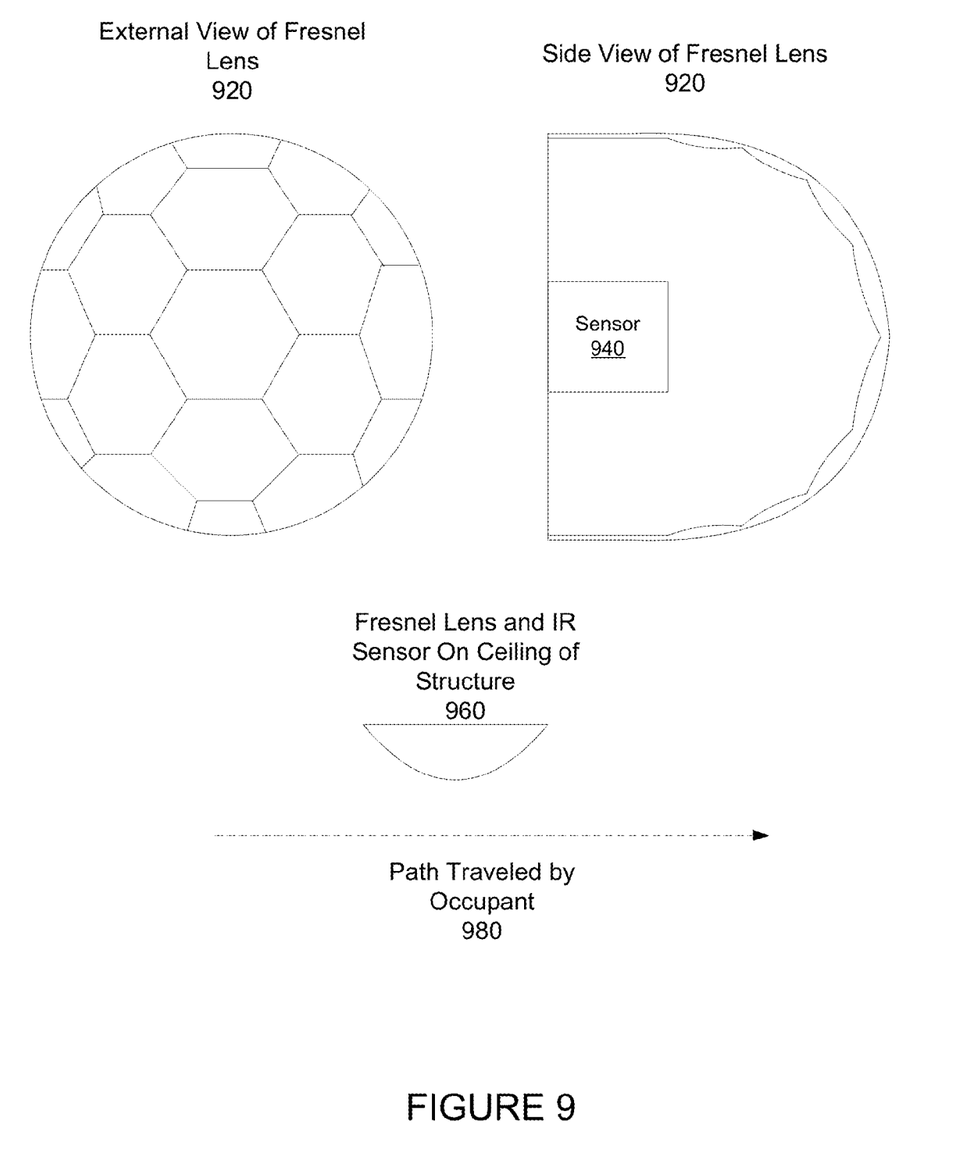
FIG. 9 shows an example of infrared sensor and an associated Fresnel lens.

If, for example, a person (occupant) is walking through a room (structure), a unique sequence of events is output from correlator 218 due to the IR sensor 210 (which as will be described, can include a Fresnel lens/IR sensor combination 960). This sequence of events is input to correlator 220 at a non-uniform rate as exemplified in table 1. If one such predetermined sequence of events is defined as an alternating pattern of small lobe and large lobe events, correlator 220 outputs the identified sequence of events.

Since there are numerous possible combinations and permutations of identified events output from correlator 218, the queue of length M of correlator 220 must be chosen to be of sufficient length to correlate with its predetermined sequences of events. A sample count, as exemplified in table 1, may be utilized to time-tag identified events and thereby identify those events that should be discarded.

TABLE 1

An Identified Sequence of Events Due to Walking Through a room

| VARIANCE | | | LOBE EVENT | | SAMPLE COUNT | | TIME | |
|---|---|---|---|---|---|---|---|---|
| t[0] | t[n − 1] | t[n − 2] | SMALL | LARGE | | Δ | (Sec) | Δ (mS) |
| 930 | 606 | 378 | X | | 16029 | | 0.000 | |
| 2999 | 2393 | 1808 | | X | 16033 | 4 | 0.063 | 63 |
| 224 | 410 | 669 | X | | 16051 | 18 | 0.348 | 284 |
| 809 | 729 | 644 | | X | 16063 | 12 | 0.537 | 190 |
| 308 | 402 | 524 | | X | 16070 | 7 | 0.648 | 111 |
| 595 | 514 | 422 | | X | 16077 | 7 | 0.758 | 111 |
| 340 | 404 | 497 | X | | 16083 | 6 | 0.853 | 95 |
| 2422 | 1723 | 1217 | | X | 16098 | 15 | 1.090 | 237 |
| 337 | 426 | 522 | X | | 16122 | 24 | 1.469 | 379 |
| 962 | 787 | 641 | | X | 16140 | 18 | 1.754 | 284 |
| 356 | 602 | 1023 | X | | 16179 | 39 | 2.370 | 616 |
| 514 | 508 | 482 | | X | 16186 | 7 | 2.480 | 111 |
| 327 | 411 | 453 | X | | 16189 | 3 | 2.528 | 47 |
| 1521 | 1250 | 976 | | X | 16212 | 23 | 2.891 | 363 |
| 350 | 683 | 1118 | X | | 16247 | 35 | 3.444 | 553 |
| 2180 | 1936 | 1563 | | X | 16256 | 9 | 3.586 | 142 |
| 297 | 501 | 785 | X | | 16275 | 19 | 3.886 | 300 |
| 1747 | 1410 | 1038 | | X | 16284 | 9 | 4.028 | 142 |
| 333 | 489 | 721 | X | | 16299 | 15 | 4.265 | 237 |
| 2170 | 1737 | 1293 | | X | 16311 | 12 | 4.455 | 190 |
| 243 | 408 | 648 | X | | 16340 | 29 | 4.913 | 458 |
| 642 | 597 | 507 | | X | 16351 | 11 | 5.087 | 174 |
| 307 | 378 | 440 | X | | 16361 | 10 | 5.245 | 158 |

Figure 3:
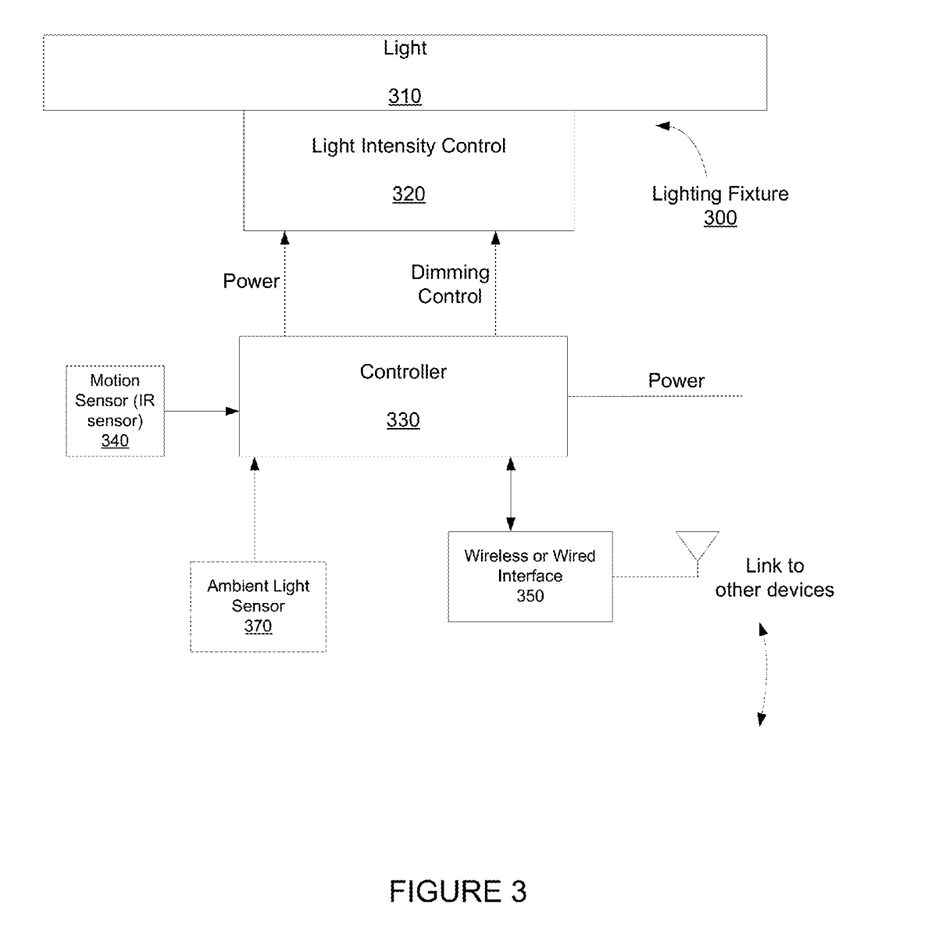
FIG. 3 a block diagram of a lighting fixture that includes embodiments of the event detector according to embodiments.

FIG. 3 a block diagram of a lighting fixture 300 that includes embodiments of the event detector. The lighting fixture includes a motion sensor 340 according to the described embodiments. Additionally, a controller 330 includes the processing of the described event detection embodiments, and therefore, provides for identification of events that occur within a structure in which the lighting fixture is located. Further, other embodiments of the controller 330 include the described embodiments for identifying sequences of events.

Based upon the identified events, embodiments of the lighting fixture provide power and/or dimming control of a light 310 of the lighting fixture 300. For at least some embodiment, the power and/or dimming control are provided to a light intensity controller 320 (such as, a lighting ballast). Based on the power and/or dimming control, the light intensity controller 320 controls the intensity of light emitted from the light 310.

Additional embodiments of the lighting fixture 300 include a wired or wireless interface 350 that allows the lighting fixture 300 to communicate through a wired or wireless link to other lighting fixtures or one or more controllers.

The identified events and/or sequences of events can be used to control the light intensity of the lighting fixture 300. Other embodiments further include the identified events and/or sequences of events aiding other lighting fixtures in control of the intensity of their light. Other embodiments include the identified events and/or sequences of events being communicated to other controllers which may then use the identified events and/or sequences of events to aid in control of security or other environmental factors (such as temperature) of the structure in which the lighting fixture 300 is located.

FIG. 3 additionally includes an optional ambient light sensor 370. A limitation with using a passive infrared (PIR) sensor for detecting occupancy arises when, for example, an occupant (person) enters a room that is lit by a light and remains near motionless for a time greater than the set period of time. If the motion is small enough, the PIR sensor may not properly detect occupancy, and the controller 330 will turn the light off after the set period of time. Another limitation arises when, for example, the occupant leaves the room. The PIR properly detects motion of the occupant, but if the occupant leaves the room, the controller 320 may maintain power to the light for the set period of time—wasting energy because the occupant has left the room, and powering the light 310 is useless.

The ambient light sensor 370 can be used to supplement intelligence of the controller 330. For the situation in which the occupant is near motionless, the ambient light sensor 370 will still detect the presence of the occupant. The controller 330 can utilize this information and maintain power to the light 310. Additionally, if the occupant leaves, the sensed level of the ambient light sensor will fall to near zero (return to within unoccupied levels), indicating that the occupant has left. The controller 330 can then turn the light 310 off, thereby saving power.

For some embodiments, the IR sensor 340, the ambient light sensor 370, and the controller 330 operate by sensing motion with the IR sensor 340, sensing variations in ambient light with an ambient light sensor 370, and detecting occupancy and controlling activation of the light 310 based on the sensed motion and the sensed variations in ambient light. For an embodiment, occupancy is detected by the ambient light sensor by detecting variations in the sense ambient light greater than a predetermined waveform.

While the IR sensor/ambient light sensor combination has been described in conjunction with lighting, clearly, this combination can be used for occupancy detection that can be used to control other elements, such as, temperature and/or security.

Figure 4:
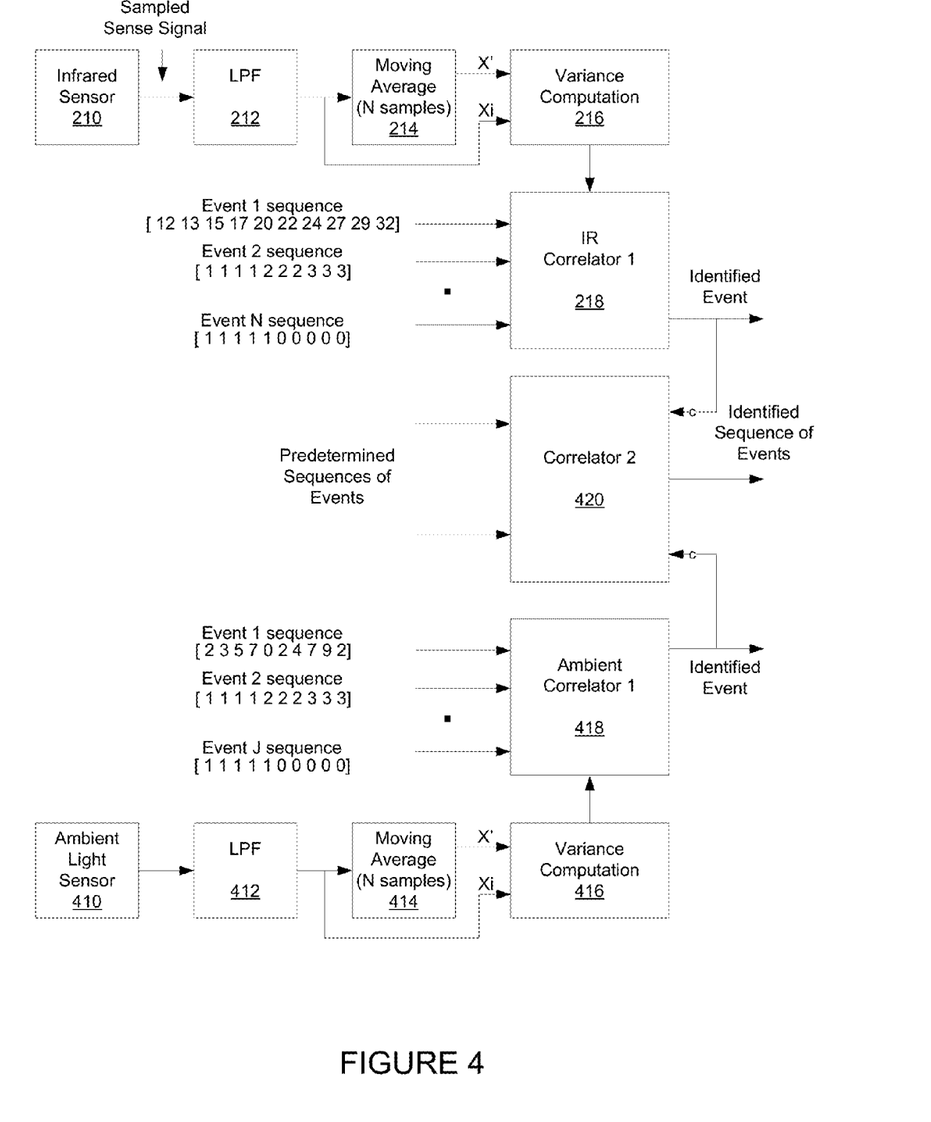
FIG. 4 shows a more detailed block diagram of an event detector that includes an Infrared sensor and an ambient light sensor according to an embodiment.

FIG. 4 shows a more detailed block diagram of an event detector that includes an Infrared sensor 210 and an ambient light sensor 410 according to an embodiment. In addition to the Infrared sensor 210 and associated event identification circuitry of FIG. 2, the embodiment of FIG. 4 additionally includes the ambient light sensor 410 that generates digital samples of a sensed ambient light signal. The sensed ambient light signal is filtered with a low pass filter (LPF) 412 to remove noise. The filtered signal is averaged over N samples. The number of samples N is selectable and adaptive, but an embodiment can advantageously select N to be a power of two to reduce processing complexity. A variance computation block 416 receives the averaged signal (X') and the instantaneous samples (Xi) and generates a variance signal. A correlator 418 matches the variance signal with a one of stored event sequences to provide identification of an event based upon the sensed signal of the ambient light sensor 410.

The second correlator 420 of FIG. 4 can receive identified events from both the IR correlator 218 and the ambient correlator 418 provides matching of sequences of identified events, thereby providing more information about activities occurring in the structure (for example, a room of a building).

The ambient light sensor 410 and associated event detection logic can be useful if, for example, motion within the structure where the sensors are located is small, and therefore, the variations of the sensed IR signal are small. The ambient light detector 410 and associated event detection circuitry can also help minimize false detections of events. For example, a standalone PIR sensor will falsely detect motion when placed in a structure in which there is significant hot air flow. The ambient light detector can be used to corroborate motion detection from the PIR sensor. Because the air flow does not trigger motion detection in the ambient light sensor, the PIR sensor's false motion triggers are ignored.

Figure 5:
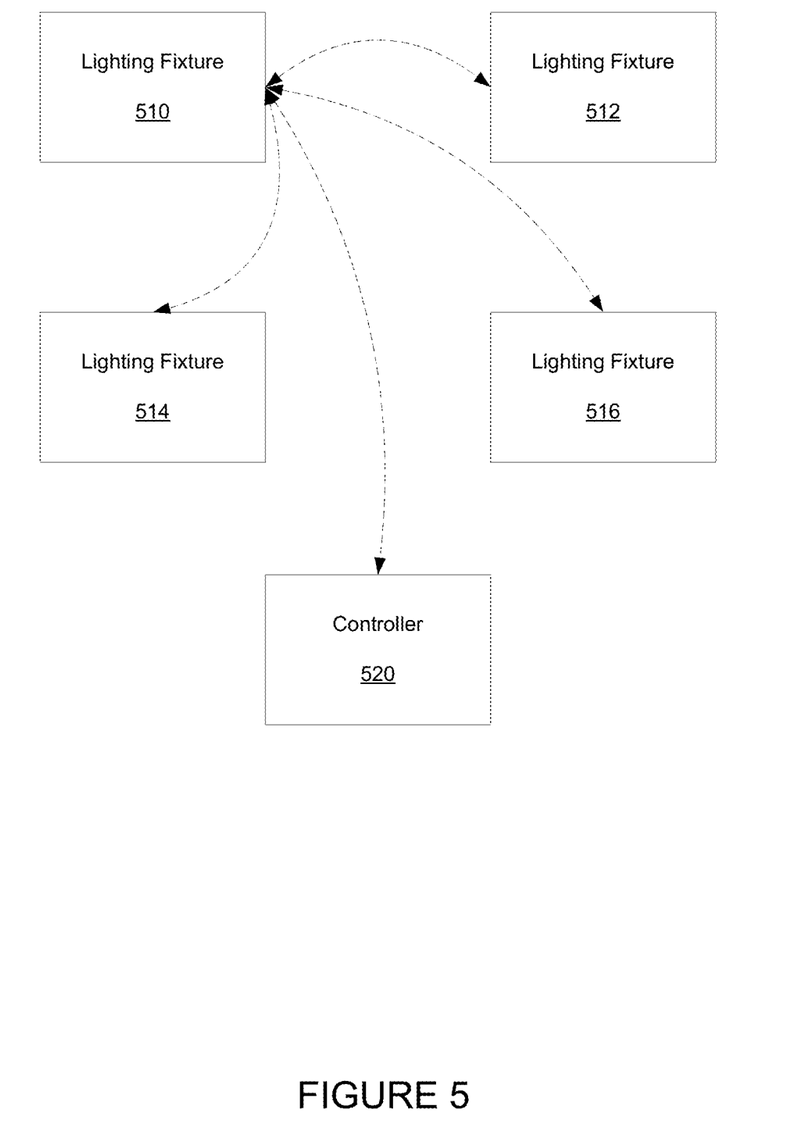
FIG. 5 shows a lighting system that includes lighting fixtures, wherein at least some of the lighting fixtures includes the event detector according to embodiments.

FIG. 5 shows a lighting system that includes multiple lighting fixtures 510, 512, 514, 516, wherein at least some of the lighting fixtures include the event detector according to embodiments. As previously described, the event detectors of each lighting fixture can be used to control the intensity of light emitted from themselves, and/or for controlling the light emitted from other lighting fixtures. Additionally, the event detectors of each lighting fixture can be used to control security or other environmental factors within the structure in which the light system is located. The lighting fixture 510 can communicate, for example, with a controller 520.

Figure 6:
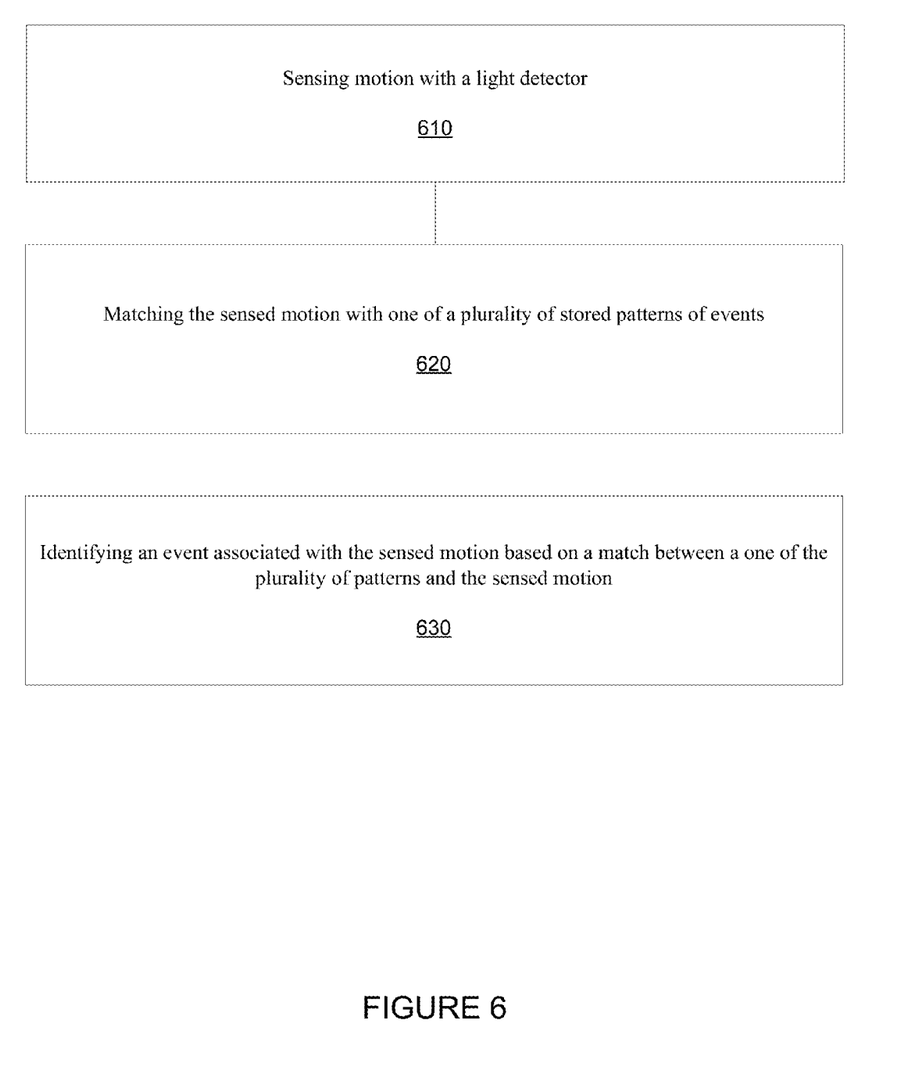
FIG. 6 shows a method that includes an example of steps of an event detector according to an embodiment.

FIG. 6 is a flow chart that includes the steps of an example of a method of identifying an event according to an embodiment. A first step 610 includes sensing motion with a light detector. A second step 620 includes matching the sensed motion with one of a plurality of stored patterns of events. A third step 630 includes identifying an event associated with the sensed motion based on a match between a one of the plurality of patterns and the sensed motion.

As described, the light sensor acts as a motion detector. The light detector can include, for example, an Infrared (IR) sensor, an ambient light sensor, or a heat sensor. Additionally, as previously described, embodiments further include matching a sequence of identified events. For one specific embodiment, the matched sequence of events provides identification of a user passing through a room that includes the light detector. For another specific embodiment, the matched sequence of events provides identification of a user entering a room that includes the light detector and then remaining near motionless. In conjunction with lighting, an embodiment further includes controlling a light associated with the light detector based at least in part on the identified event.

Figure 7:
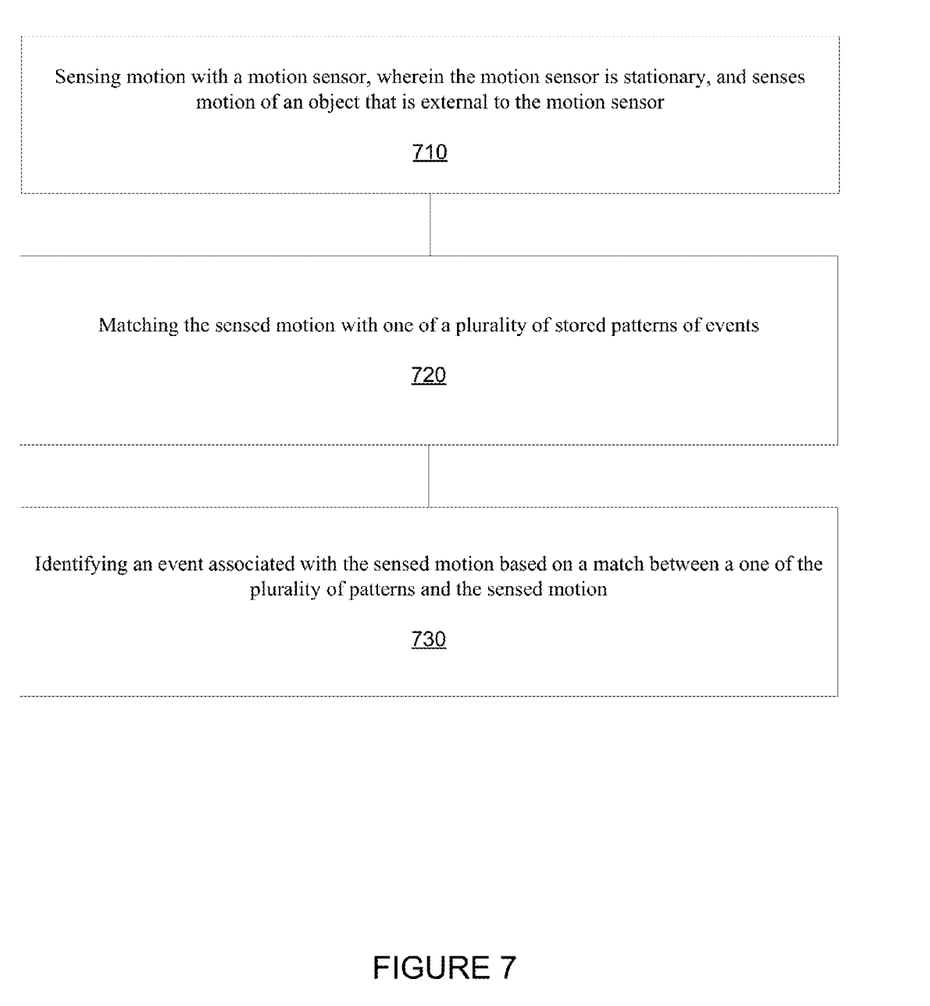
FIG. 7 shows a method that includes another example of steps of an event detector according to an embodiment.

FIG. 7 shows a method that includes another example of steps of an event detector according to an embodiment. A first step 710 includes sensing motion with a motion sensor, wherein the motion sensor is stationary, and senses motion of an object that is external to the motion sensor. A second step 720 includes matching the sensed motion with one of a plurality of stored patterns of events. A third step 730 includes identifying an event associated with the sensed motion based on a match between a one of the plurality of patterns and the sensed motion.

It is to be noted that this embodiment specifically includes the motion sensor being stationary. That is, the motion sensor is fixed, for example, to a wall or ceiling of the structure. The motion being detected is motion of an object (or occupant) within the structure in which the motion sensor is located. For example, if the motion sensor includes an IR sensor (or other types of light sensor), the IR sensor senses an IR signal of objects within the structure. The IR sensor itself is substantially fixed in its location while objects and/or occupants proximate to the IR sensor are mobile.

Figure 8:
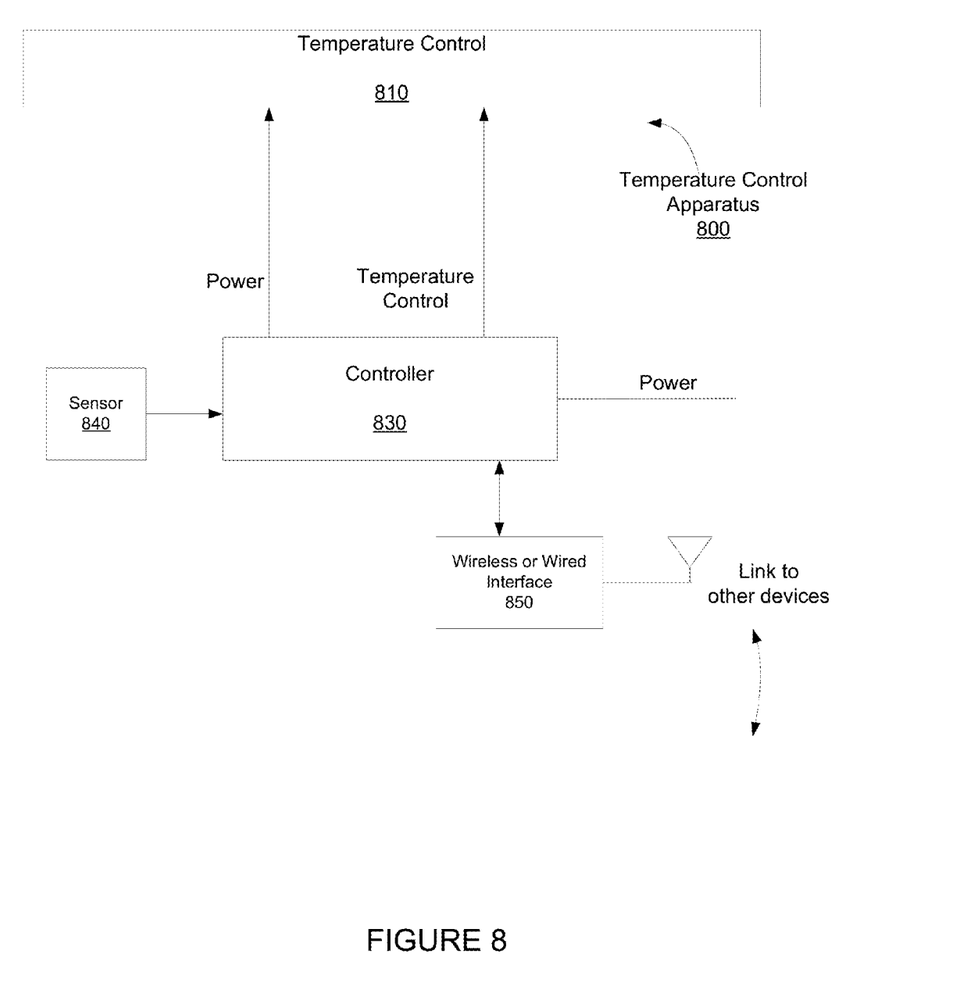
FIG. 8 a block diagram of a temperature control apparatus that includes embodiments of the event detector according to embodiments.

FIG. 8 a block diagram of a temperature control apparatus 800 that includes embodiments of the event detector. This embodiment depicts that the event detection methods of the described embodiments can additionally or alternatively be adapted for use in heating/cooling systems within the structure that event detection devices are located. A sensor 840 senses motion, and a controller 830 is operative to identify an event based on the sensed motion. A temperature controller 810 (for example, heater or air conditioner) is controlled by the controller 830 based on detected events. The controller 830 can additionally be connected to other controllers through an interface 850.

Through the described embodiments for event detection, and detection of sequences of events, intelligent temperature control can be provided. For example, if an occupant merely passes through a room or structure, the intelligent temperature controller can detect this event (or sequence of events) and not activate a heater or air conditioner. A sequence of events that indicate, for example, that a janitor is cleaning cubicles within a structure can be identified, and the temperature controller can act appropriately to minimize or reduce energy used to heat or cool the structure.

FIG. 9 shows an example of infrared sensor 940 and an associated Fresnel lens 920. An embodiment of the Fresnel lens 920 is fabricated out of plastic (or the equivalent) to allow IR light to pass through the lens 920. The Fresnel lens 920 focuses the received IR energy to effectively increase the signal to noise ratio (SNR) of the received IR signal. The Fresnel lens 920 of FIG. 9 includes hexagon-type focusing elements. A characteristic of a Fresnel lens 920 is that the signal received by the sensor 940 includes distinct characteristics for situations, such as, when an occupant passes nearby by the Fresnel lens 940/sensor 940 combination.

As also depicted in FIG. 9, a Fresnel lens/IR sensor combination 960 on, for example, a ceiling, exhibits a unique characteristic as an occupant 980 travels past the Fresnel lens/IR sensor combination 960. For example, an embodiment of the Fresnel lens/IR sensor combination 960 generates a sensed signal that cycles between a high state and a low state of sensed signal amplitude due to the unique signal focusing characteristics of the Fresnel lens/IR sensor combination 960. The unique characteristics can be utilized to aid in detection of events (activity) proximate to the Fresnel lens/IR sensor combination 960.

Figure 10:
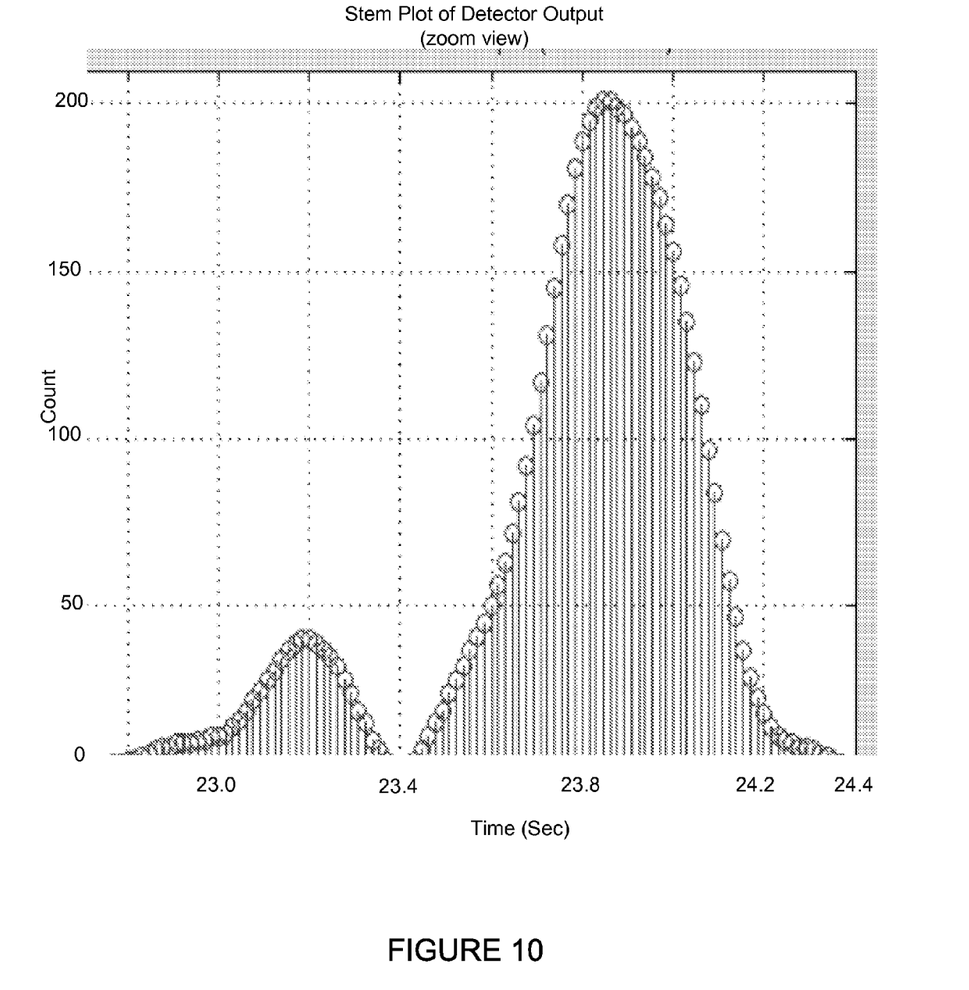
FIG. 10 is a time-line that shows an example of a sensed signal of an infrared sensor and a Fresnel lens.

FIG. 10 is a time-line that shows an example of a sensed signal consisting of an infrared sensor coupled with a Fresnel lens. The variance of the sensed signal is plotted on the Y-axis, with respect to the time, in seconds, on the X-axis. Each instantaneous sample is represented by a stem, and since the number of samples N utilized by the system is selectable, it consists of some contiguous sequence of N instantaneous samples. The figure represents a person entering a Fresnel zone at an arbitrary angle with respect to the infrared sensor. A sequence of one or more smaller lobes, followed by a lobe of significantly greater magnitude, is characteristic of the Fresnel lens/IR sensor combination 960.

Although specific embodiments have been described and illustrated, the described embodiments are not to be limited to the specific forms or arrangements of parts so described and illustrated. The embodiments are limited only by the appended claims.

What is claimed is:

1. A method of identifying an event, comprising:
sensing motion with a light detector;
matching the sensed motion with one of a plurality of stored patterns of events; and
identifying an event associated with the sensed motion based on a match between a one of the plurality of patterns and the sensed motion.

2. The method of claim 1, wherein the light detector comprises an Infrared (IR) sensor.

3. The method of claim 1, wherein the light detector comprises an ambient light sensor.

4. The method of claim 1, wherein the light detector comprises an IR sensor and an ambient light sensor, and the method further comprises:
sensing motion with the IR sensor;
sensing variations in ambient light with the ambient light sensor:
detecting occupancy and controlling activation of a light based on the sensed motion and the sensed variations in ambient light.

5. The method of claim 1, wherein the light detector comprises a heat sensor.

6. The method of claim 1, further comprising matching a sequence of identified events.

7. The method of claim 6, wherein the matched sequence of events provides identification of a user passing through a room that includes the light detector.

8. The method of claim 6, wherein the matched sequence of events provides identification of a user entering a room that includes the light detector and then remaining near motionless.

9. The method of claim 1, further comprising controlling a light associated with the light detector based at least in part on the identified event.

10. A method of identifying an event, comprising:
sensing motion with a motion sensor, wherein the motion sensor is stationary, and senses motion of an object that is external to the motion sensor;
matching the sensed motion with one of a plurality of stored patterns of events; and
identifying an event associated with the sensed motion based on a match between a one of the plurality of patterns and the sensed motion.

11. The method of claim 10, wherein the motion sensor comprises an IR sensor and an ambient light sensor, and the method further comprises:
sensing motion with the IR sensor;
sensing variations in ambient light with the ambient light sensor:
detecting occupancy and controlling activation of a light based on the sensed motion and the sensed variations in ambient light.

12. A sensing device, comprising:
a light sensor sensing motion;
a processor, the processor configured to:
match the sensed motion with one of a plurality of stored patterns of events; and
identify an event associated with the sensed motion based on a match between a one of the plurality of patterns and the sensed motion.

13. A lighting fixture, comprising:
a light;
a motion sensor sensing motion;
a processor, the processor configured to:
match the sensed motion with one of a plurality of stored patterns of events; and
identify an event associated with the sensed motion based on a match between a one of the plurality of patterns and the sensed motion;
adjust an intensity of the light based at least in part on the identified event.

14. The lighting fixture of claim 13, further comprising the processor configured to communicate the identified event to another device.

15. The lighting fixture of claim 13, further comprising the processor configured to match a sequence of identified events.

16. The lighting fixture of claim 15, wherein the matched sequence of events provides identification of a user passing through a room that includes the light detector.

17. The lighting fixture of claim 15, wherein the matched sequence of events provides identification of a user entering a room that includes the light detector and then remaining near motionless.

18. The lighting fixture of claim 13, further comprising the processor configured to communicate with an external device.

19. The lighting fixture of claim 13, wherein the external device influences at least one of a security system and an environment control system based at least in part on the identified event.

20. The lighting fixture of claim 13, wherein the motion sensor comprises an IR sensor and an ambient light sensor, and the processor is further configured to:
detect occupancy and control activation of the light based on the sensed motion by the IR sensor and the sensed variations in ambient light by the ambient light sensor.

21. A lighting system, comprising a plurality of lighting fixtures that communicate with each other, each lighting fixture comprising:
a light;
a motion sensor sensing motion;
a processor, the processor configured to:
match the sensed motion with one of a plurality of stored patterns of events; and
identify an event associated with the sensed motion based on a match between a one of the plurality of patterns and the sensed motion;
adjust an intensity of the light based at least in part on the identified event.

22. The lighting system of claim 21, further comprising at least one lighting fixture communicating with an external device.

23. The lighting system of claim 21, wherein the external device influences at least one of a security system and an environment control system based at least in part on the identified event.

* * * * *